United States Patent
Gohara et al.

[11] Patent Number: 5,656,046
[45] Date of Patent: Aug. 12, 1997

[54] INLET AWNING FOR HIGH VELOCITY ABSORBERS

[75] Inventors: Wadie F. Gohara, Barberton; Randy J. Reynolds, Canton, both of Ohio

[73] Assignee: The Babcock & Wilcox Company, New Orleans, La.

[21] Appl. No.: 587,180

[22] Filed: Jan. 16, 1996

[51] Int. Cl.$^6$ .................................................. B01D 47/12
[52] U.S. Cl. .................... 55/223; 55/240; 55/260; 261/DIG. 9
[58] Field of Search ........................ 55/260, 418, 223, 55/240; 95/216, 217; 261/117, 126, DIG. 9, 112.1, 110

[56] References Cited

U.S. PATENT DOCUMENTS

| | | | |
|---|---|---|---|
| 420,718 | 2/1890 | Cochrane | 55/260 X |
| 2,234,735 | 3/1941 | Lambert et al. | 55/223 |
| 2,767,806 | 10/1956 | Blake | 55/223 |
| 3,615,199 | 10/1971 | Terrana et al. | 55/260 X |
| 3,616,610 | 11/1971 | Javorsky et al. | 55/260 X |
| 3,885,929 | 5/1975 | Lyon et al. | 95/216 X |
| 5,403,523 | 4/1995 | Strock et al. | 261/111 |

FOREIGN PATENT DOCUMENTS

| | | | |
|---|---|---|---|
| 1241804 | 6/1967 | Germany | 55/260 |

*Primary Examiner*—Richard L. Chiesa
*Attorney, Agent, or Firm*—Daniel S. Kalka; Robert J. Edwards

[57] ABSTRACT

A high velocity gas absorber for desulfurization of flue gas has a uniquely formed awning and inlet having an inclined awning extending upwardly from the inlet at an angle between 5 and 20 degrees and having strategically placed triangularly shaped gutters therealong for drawing the liquid flow across the inlet while the inlet bottom plate is inclined downward at an angle of approximately 60 degrees of the inlet horizontal bottom plate into the liquid of the absorber's recirculation tank to reduce splash into the inlet.

9 Claims, 4 Drawing Sheets

INLET AWNING FOR HIGH VELOCITY ABSORBERS

BACKGROUND OF THE INVENTION

1. Field of the Invention

The present invention relates to low, normal, and high velocity absorbers generally and more particularly to air inlet designs for same.

2. Description of the Related Art

Power generation units require desulfurization and use high velocity absorbers for same because they offer economic advantages such as less capital costs, less real estate requirements, allow shorter more compact absorbers, and provide improved $SO_2$ removal efficiency. On the other hand, high velocity has some disadvantages such as increased resistance to the gas flow, increased sensitivity of the system to changes in the hydraulic behavior of the gas and liquid phases, and especially sensitivity to low L/G ratio.

Physical model studies show that the gas velocity through the inlet and the absorber L/G greatly affects the gas distribution and mist eliminator performance of the absorber. Conventional absorber inlet designs providing gas velocities at or below 3000 feet per minute, result in good gas distribution across the absorber at moderate L/G ratio and with the gas flow in the absorber held in the range of 1 to 12.5 feet per second. At these operating parameters the liquid curtain falling off the protective awnings above the inlet provide protection against inlet wetness at low load operation and provide ample resistance to distribute the gas across the absorber cross section. Any gas flow distortion can be tolerated at these conditions because of the large margin in gas velocity before mist eliminator failure.

As gas velocity in the absorber increases above 12.5 feet per second and approach 20 feet per second, the influence of the L/G diminishes, the resistance of the liquid curtain falling off the awning becomes significant and magnifies the effects of gas flow distortion. A droplet as large as ¼ inch in diameter can be carried up in the absorber gas stream at a gas velocity of 20 feet per second.

While the liquid curtain is needed to humidify and help gas redistribution it causes two significant problems:

1. Significantly increases the inlet pressure drop.
2. Distorts the flow pattern as the gas rises through the absorber.

In the new generation of high velocity absorbers, gas velocity is set between 15 and 20 feet per second. Minor distortion in the gas flow pattern results in localized gas velocities approaching the failure limits of the mist eliminator as the gas velocity approaches or exceeds the 20 feet per second limit.

To overcome the negative effects of the high inlet gas velocity, prior art absorbers used increased inlet flow areas and limited the gas velocity to the conventional 3000 feet per minute in the absorber. This solution while simple and practical resulted in a larger inlet aspect ratio and increased the absorber height. Other prior art designs used advanced low pressure drop gas inlets or used the available means within the system to redistribute the gas flow without significant increase in the inlet's resistance.

As may be best seen in FIGS. 1 and 2, prior art absorber inlets may vary in shape and size but are basically an opening in the side of an absorber tower. FIG. 1 shows the commonly offered inlet design without any protective awning. In this design, the liquid flowing off the absorber walls and any nearby spray headers falls on the inlet bottom plate causing solid growth known as "Elephant Ears". To overcome this problem, a designer places protective awnings on top of the inlet to divert the liquid curtain flow into the center of the absorber where gas humidification occurs with minimum contact between the hot gas and solid surfaces. This design as best seen in FIG. 2, has been proven functional at the traditional gas velocities and when the spray zone resistance is large enough to affect even distribution before the gas reaches the mist eliminator. As the gas velocity increases or the L/G decreases, however, the curtain resistance adds significantly to the overall system pressure drop and distortions to gas flow pattern becomes more critical. Lower liquid resistance in the upper portion of the absorber tower does not help gas redistribution.

U.S. Pat. No. 5,403,523 describes a device which deflects liquid slurry flow away from an inlet flue.

In view of the foregoing, it is seen that what is needed is a high velocity absorber having a combination of an advanced gas inlet design equipped with a flexible awning design capable of humidifying the entering gas, reducing the inlet pressure drop, controlling gas distribution across the absorber, and particularly for use when the spray zone resistance in the absorber is not adequate to correct gas flow distortions.

SUMMARY OF THE INVENTION

The present invention provides a combined improvement of the high velocity absorber inlet and accompanying awning structure. The improved awning comprises a diverging awning attached to the inlet at the intersection of the inlet and the absorber front wall. The diversion of the awning is different from prior art designs because the awning plate is attached to the absorber at the intersection of the inlet and the absorber shell. The awning thus protects the inlet and diverts the liquid flow to a designated drain area. The awning flares upward and away from the absorber wall at an angle not less than 15 to 20 degrees from the horizontal to provide gradual expansion compatible with the natural expansion of the gas into the absorber. The liquid accumulating above the awning may be drained from gutters placed at strategic locations therealong to affect equal gas distribution across the width of the inlet and/or from the awning ends if the gutters fill up. The gutter structure provides stiffening and support to the awning structure as well.

The gutters are formed as an open triangular structure located at intervals across the awning. The base of the triangle is horizontal and at the same elevation as the inlet top plate. The width and location of the gutters is determined by modeling to provide resistance to flow in the desired locations and results in an even gas flow distribution across the inlet and at the mist eliminator.

The bottom plate of the inlet slopes downward at an angle less than 60 degrees off the inlet bottom plate. To eliminate any increase in absorber height, the inclined inlet plate connects to the tank walls and is immersed under the tank's normal operating liquid level. The slope of the bottom inlet plate thus provides added protection against back spray of liquid into the inlet specially at low gas flow rates. The inclined inlet bottom plate is attached directly to the absorber walls to eliminate any horizontal surfaces at the absorber and inlet lower plate interface. The horizontal bottom plate of the inlet attaches to the free end of the inclined plate (away from the absorber shell).

In view of the foregoing it will be seen that one aspect of the present invention is to provide an improved awning for high velocity absorbers which will reduce and distribute the density of the liquid curtain falling therealong to prevent mist eliminator failure due to gas maldistribution and excessive localized velocity.

Another aspect of the present invention is to provide an improved awning for a high velocity absorber which will allow a gradual expansion of inlet gas into the absorber by providing an upwardly flared awning.

Yet another aspect of the present invention is to provide an improved high velocity absorber inlet sloped down to prevent back spray of liquid into the inlet at low gas flow rates.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1a is a cross-sectional view taken along section P—P of the FIG. 1 embodiment;

DESCRIPTION OF THE PREFERRED EMBODIMENTS

Figure 1:
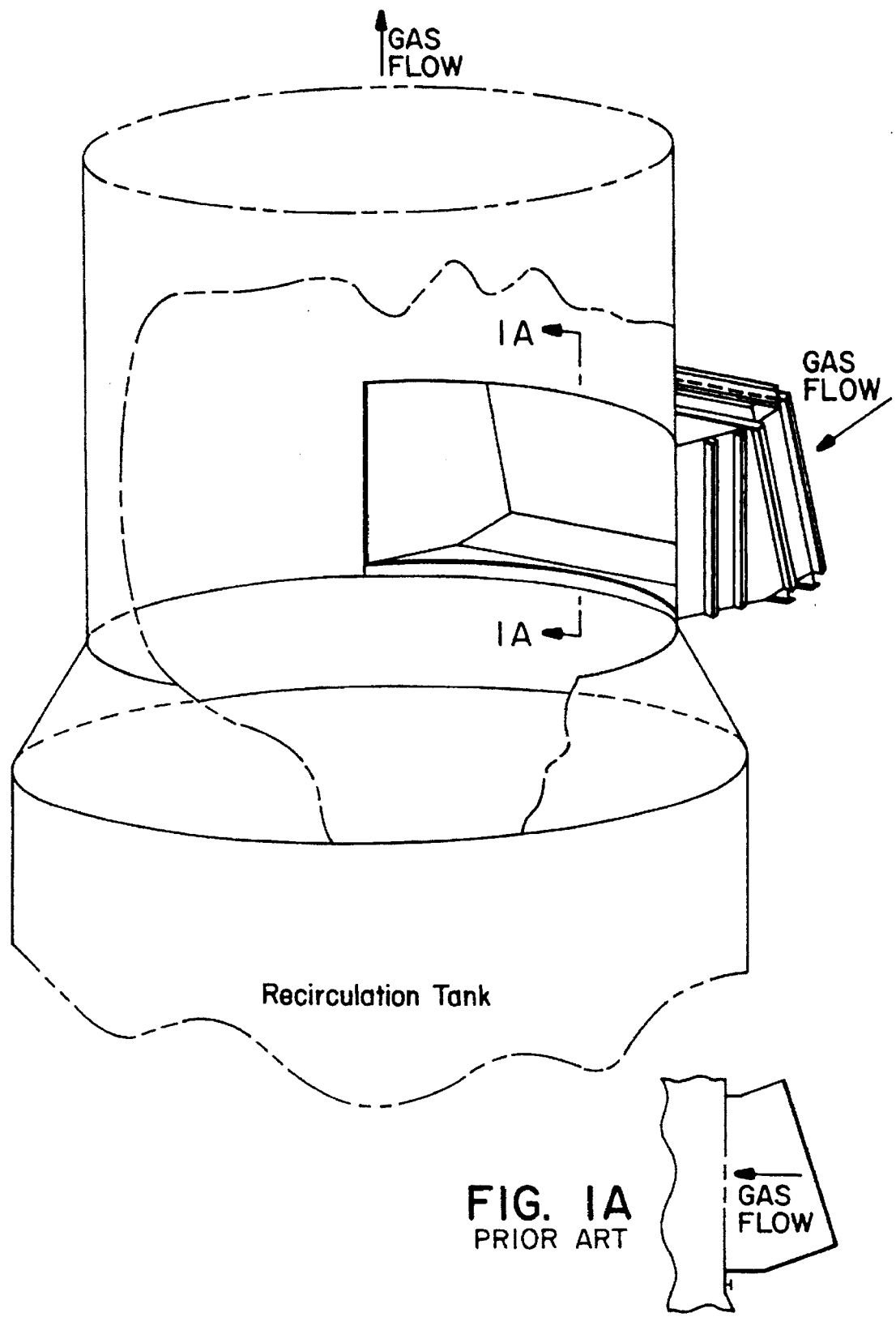
FIG. 1 is an isometric view of a prior art absorber having an inlet with no awning.

Referring now to the drawings, it will be understood that the showings are intended to describe a preferred embodiment of the invention and are not intended to limit the invention thereto.

Figure 3:
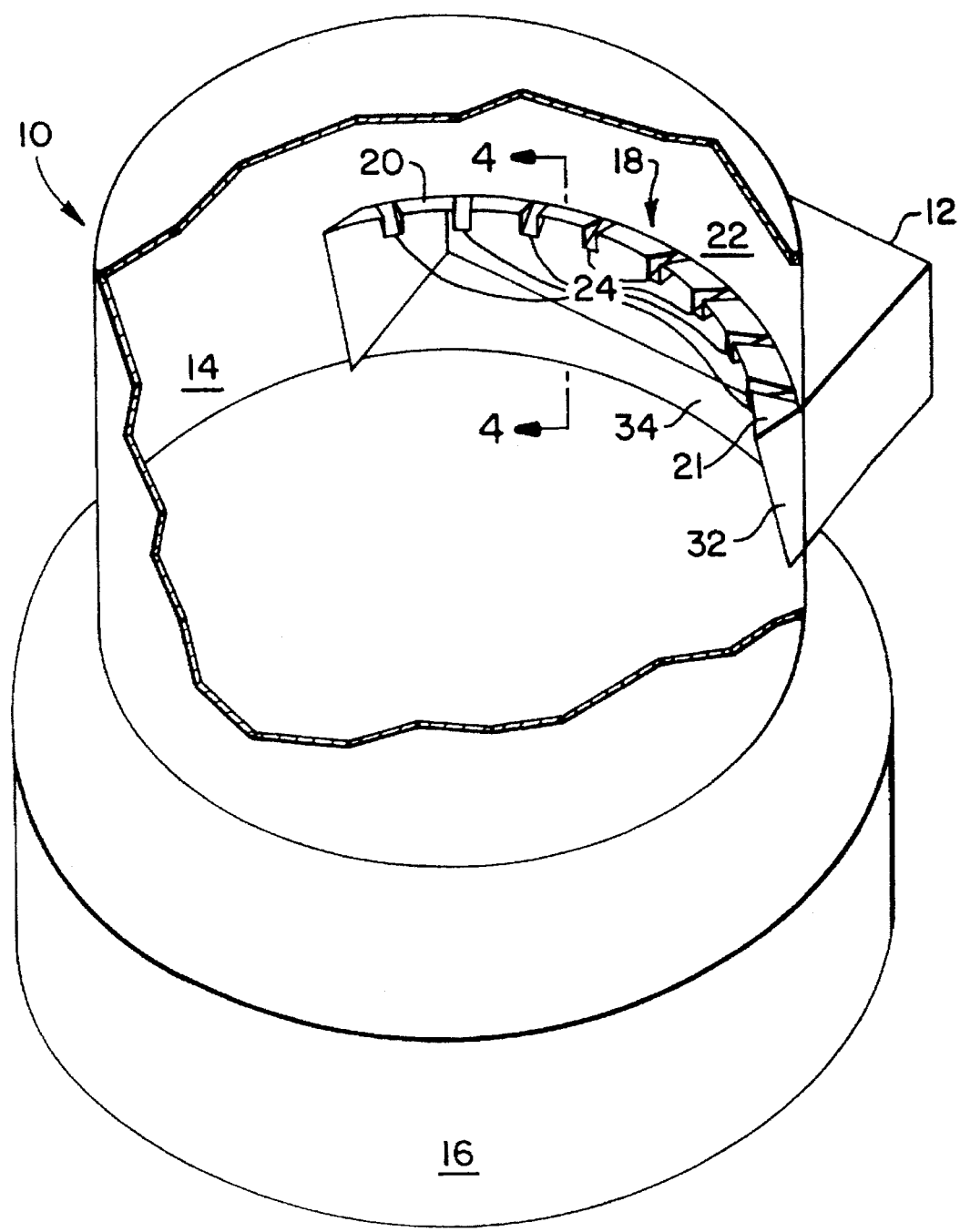
FIG. 3 is an isometric view of a high velocity absorber having the upwardly inclined awning and downwardly sloped bottom inlet of the present invention.
Figure 4:
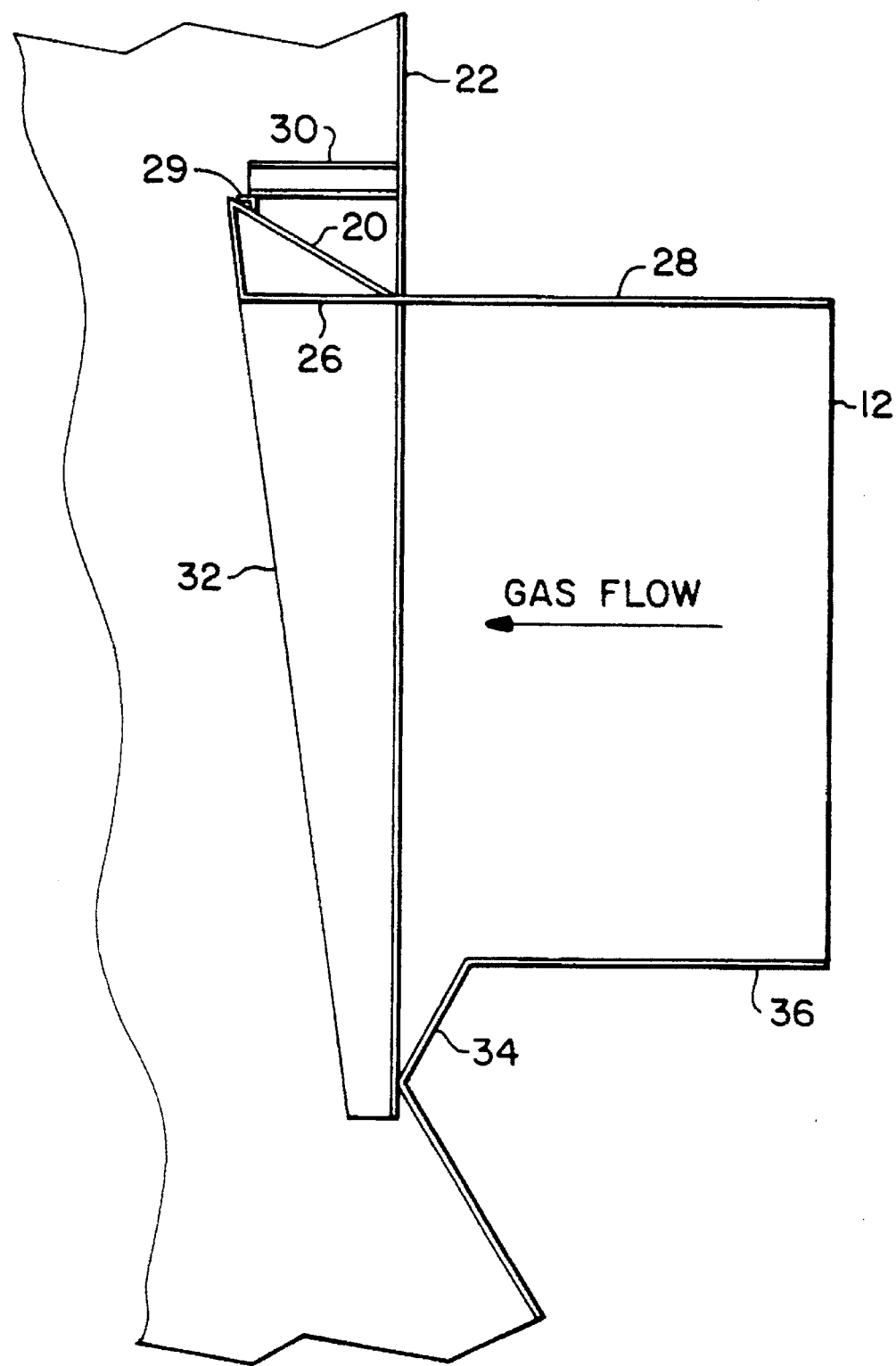
FIG. 4 is a cross-sectional view taken along section A—A of the FIG. 3 embodiment.

FIGS. 3 and 4 show high velocity absorber assembly 10 used in power generation plants to provide desulfurization of flue gases prior to their exhaust to the atmosphere. Details of such absorber assemblies are well known and have been deleted herein for the sake of conciseness and readability.

General operation of the absorber assembly (10) involves the passing of flue gas from an inlet (12) to the absorber tower (14) where it flows up therethrough usually against a cross-current of desulfurizing spray injected into the tower (14) from a series of spray nozzles (not shown) located in the tower. The flow in the spray nozzles is recirculated from a recirculating tank (16) which is maintained at a liquid level below the inlet (12). The flue gas is desulfurized by passing through the spray and any entrained water droplets are eliminated by a mist eliminator (not shown) located at the top of the tower (14). The demisted flue gas passed therefrom is exhausted to atmosphere usually through a stack (not shown).

Figure 2:
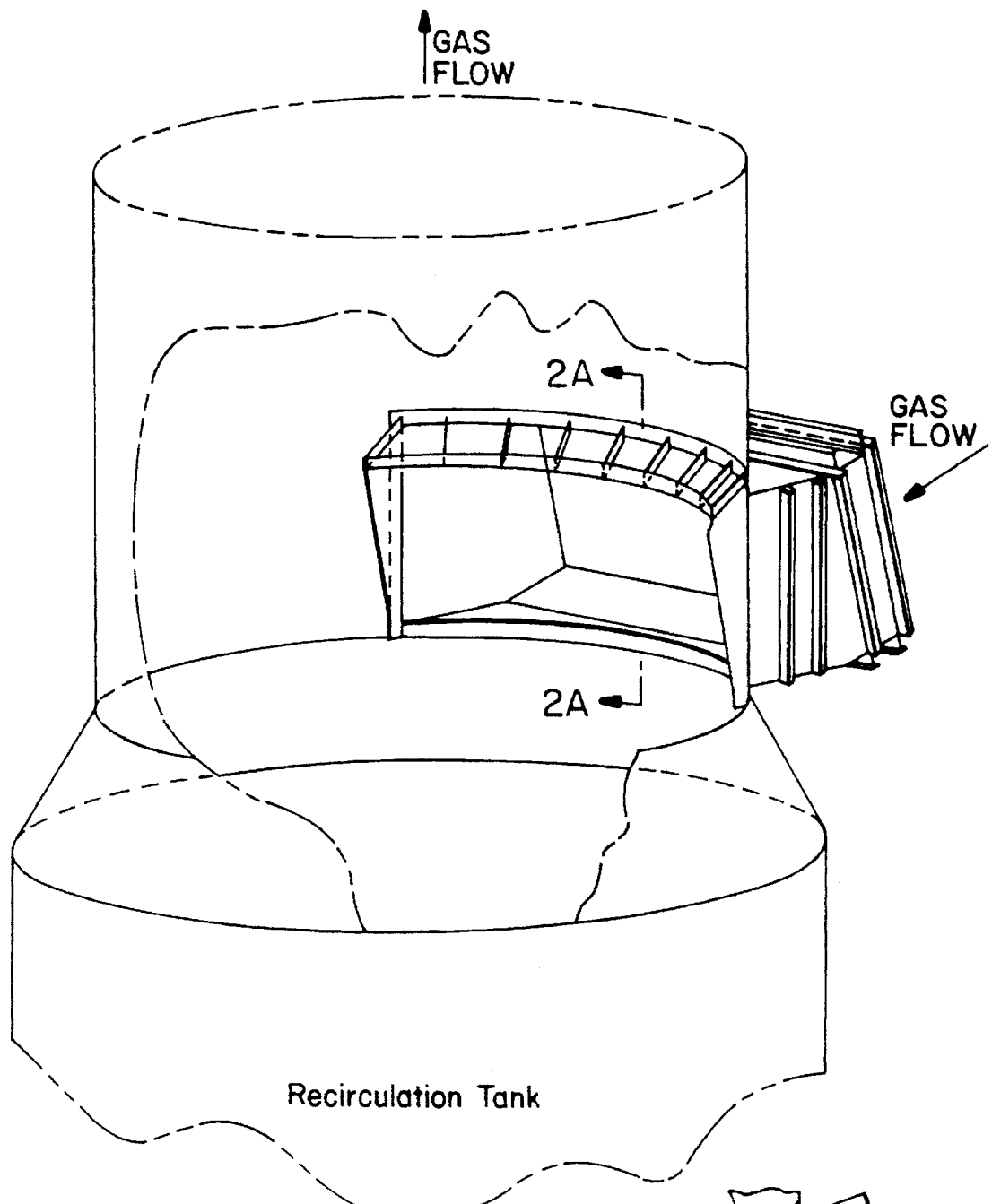
FIG. 2 is an isometric view of a prior art absorber having an inlet with a downwardly inclined awning.
Figure 2A:
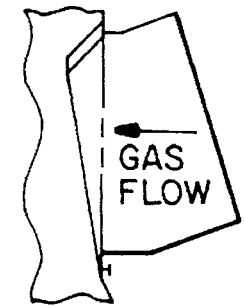
FIG. 2a is a cross-sectional view taken along section K—K of the FIG. 2 embodiment.

The diverging awning assembly (18) is formed from an awning plate (20) attached to the inlet (12) at the intersection of the inlet (12) and the tower (14) curved wall (22) proximate to the inlet (12). Diversion of the awning (18) is different from the FIG. 2 prior art design because the awning plate (20) is attached to the absorber assembly (10) at the intersection of the inlet and the absorber shell. The awning thus protects the inlet (12) and diverts the liquid flow to namely drain gutters (24).

The awning (18) flares upward and away from the absorber wall (22) at an angle not less than approximately 5 degrees and not greater than 15 to 20 degrees from the horizontal. This configuration provides a gradual expansion of the flue gas flow from the inlet (12) into the absorber assembly (10). The liquid accumulating above the awning (18) is drained from either side (21) of the awning (18) and from the gutters (24) placed at strategic locations. The gutter (24) structure also provides stiffening and support to the awning assembly (18). The gutters (24) are formed as an open triangular structure located at intervals across the awning. Gutters (24) may be positioned either horizontally or descending in the absorber (14). As best seen in FIG. 4, the base (26) of the triangle is horizontal and at the same elevation as the inlet top plate (28). The width and location of the gutters (24) is determined by computer or physical modeling to provide resistance to gas flow in the desired locations and result in an even gas flow distribution at the outlet. FIG. 4 best shows the support structure for the awning and gutters off the absorber (10) front wall (22). Support walls are located at each gutter and additional supports may be added as required. These supports consist of an angle iron (29) welded to awning plate across the upper gutter opening, which is connected by a tie bar (30) to the absorber wall (22) behind the awning plate (20).

Two side shields (32) are located at the ends of the awning plate (20) to support the free ends of the awning assembly (18) and protect the inlet (12) sides from liquid splashing.

The bottom plate (34) of the inlet (12) is formed to slope downward at an angle less than 60 degrees off the inlet bottom plate. To eliminate any increase in absorber (10) height, the inclined inlet plate (34) is connected to the tank walls. The slope of the bottom inlet plate provides added protection against back spray of liquid into the inlet specially at low gas flow rates. The inclined inlet (34) bottom plate is attached directly to the absorber walls (22) to eliminate any horizontal surfaces at the absorber and inlet lower plate (34) interface. The horizontal bottom plate (36) of the inlet attaches to the free end of the inclined plate (away from the absorber shell).

In view of the foregoing, it is now apparent that the improved awning and inlet from high velocity absorbers of the present invention provides various advantages over known designs. Some of the more important advantages are:

1. The upward incline awning diverts the liquid falling on the awning to selected flow channels namely the sides and the gutters. This diversion reduces the resistance to the entering gas by reducing the density of the liquid curtain while providing adequate liquid flow for gas humidification.
2. The gutters when located in the proper place form resistance pockets that can be used to correct and evenly distribute the gas flow.
3. The gutters serve as stiffeners to the awning plate and as channels to drain liquid in the areas where resistance to gas flow is needed.
4. The divergent awning allows gradual expansion of the gas into the absorber and reduces the shock losses caused by the sudden expansion of the gas.
5. The inclined bottom inlet plate provides more protection against backflow of the liquid into the inlet at low gas flow rates and provides a gradual gas expansion at the bottom end too.

6. The side shields act as supports to the awning and prevent the falling liquid from entering the inlet.

Inlet and outlet pressure drop constitute the major components of the high velocity absorbers pressure drop, lowering the inlet pressure drop of high velocity absorbers and using this resistance in the spray zone enhances their performance.

While specific embodiments of the invention have been shown and described in detail to illustrate the application of the principles of the invention, it will be understood that the invention may be embodied otherwise without departing from such principles. As an example, it will be apparent that this invention is particularly important for low L/G designs such as magnesium enhanced lime systems. In such installations good gas flow distribution at the inlet is essential because the low spray zone pressure drop would not adequately correct any maldistribution.

What is claimed is:

1. A high velocity gas absorber, comprising:

an absorption tower having a liquid spray therein;

an inlet to said tower to provide a flow of gas therethrough at a gas velocity greater than or equal to 12.5 feet per second; and an awning assembly located at the entrance of said inlet into said tower comprising an upwardly elevated awning plate to allow a gradual expansion of gas flow from said inlet into said absorber, said awning assembly including a plurality of spaced gutters for providing channels for draining fluid flow trapped by said awning plate and constructed to provide areas of resistance to gas flow.

2. An absorber as set forth in claim 1, wherein said awning plate is upwardly inclined at an angle not less than 5 degrees and not exceeding 15 to 20 degrees from the horizontal.

3. An absorber as set forth in claim 1, wherein each of said plurality of spaced gutters is formed as an open triangle having a horizontal base.

4. An absorber as set forth in claim 3, wherein said horizontal base is at the same elevation as the top horizontal plate of said inlet.

5. An absorber as set forth in claim 1, wherein said inlet is formed to have a downwardly inclined bottom plate connected to a tank wall of the absorber.

6. An absorber as set forth in claim 5, wherein said bottom plate is inclined at an angle less than 60 degrees from the inlet horizontal bottom plate.

7. An absorber as set forth in claim 6, including side shields formed at the ends of said awning assembly to protect the inlet sides from fluid splashing.

8. An absorber as set forth in claim 1, including side shields formed at the ends of said awning assembly to protect the inlet sides from fluid splashing.

9. An absorber as set forth in claim 1 wherein each of said plurality of spaced gutters is formed as an open triangle having a descending base.

* * * * *